United States Patent [19]
Tanaka et al.

[11] Patent Number: 5,301,572
[45] Date of Patent: Apr. 12, 1994

[54] SHIFT CONTROL METHOD FOR AN AUTOMATIC TRANSMISSION OF AN AUTOMOTIVE VEHICLE

[75] Inventors: Yuichi Tanaka, West Bloom Field, Mich.; Yasuhiro Nakajima, Kyoto, Japan; Toshitaka Naruse, Kyoto, Japan; Katsuhiro Hatta, Kyoto, Japan

[73] Assignee: Mitsubishi Jidosha Kogyo Kabushiki Kaisha, Tokyo, Japan

[21] Appl. No.: 16,192

[22] Filed: Feb. 11, 1993

Related U.S. Application Data

[63] Continuation of Ser. No. 763,260, Sep. 20, 1991, abandoned.

[30] Foreign Application Priority Data

Oct. 2, 1990 [JP] Japan .................. 2-264229
Oct. 2, 1990 [JP] Japan .................. 2-264230

[51] Int. Cl.⁵ .............................................. F16H 61/08
[52] U.S. Cl. .................................................. 74/866
[58] Field of Search ........................ 74/866; 364/424.1

[56] References Cited

U.S. PATENT DOCUMENTS 4,732,246 3/1988 Tateno et al. ............... 74/866 X
4,775,938 10/1988 Hiramatsu .................... 74/866 X
4,793,216 12/1988 Hiramatsu et al. ............. 74/866
4,800,497 1/1989 Koori et al. ................. 74/866 X
4,846,021 6/1989 Hamano et al. ................. 74/866
4,969,098 11/1990 Leising et al. .............. 364/424.1

FOREIGN PATENT DOCUMENTS 58-46258 3/1983 Japan .

Primary Examiner—Dirk Wright

[57] ABSTRACT

A shift control method for an automatic transmission of an automotive vehicle comprises a preliminary stage which is executed for eliminating the play in mechanism of a low/reverse brake of the automatic transmission at a shifting, particularly at a shifting of the transmission from the neutral position to a running position when the vehicle is at rest, and an engagement stage which is executed subsequently to the preliminary stage for operating the brake substantially. In the preliminary and engagement stages, the fluid pressure supplied to the brake is controlled in accordance with the precontrol pattern and the main control pattern, respectively. The shift control method further comprises a step of correcting a factor defining the precontrol pattern such that the time required from the start of the engagement stage to the start of a substantial shifting of the automatic transmission coincides with an ideal reference time, and a step of correcting the initial value of the fluid pressure supplied to the engaging element at the start of the main control pattern such that the rate of change in the rotational speed of the input shaft of the transmission during the period from the start of the substantial shifting to the end of same coincides with an ideal reference rate.

21 Claims, 13 Drawing Sheets

SHIFT CONTROL METHOD FOR AN AUTOMATIC TRANSMISSION OF AN AUTOMOTIVE VEHICLE

This application is a continuation, of application Ser. No. 763,260 filed on Sep. 20, 1991, now abandoned.

BACKGROUND OF THE INVENTION

1. Field of the Invention

This invention relates to a shift control method for an automatic transmission of an automotive vehicle, and more particularly, to a shift control method capable of optimally carrying out a shifting of the automatic transmission from a neutral position to a reverse or drive position when the vehicle is moved from standstill.

2. Description of the Related Art

Automatic transmissions for vehicles have an input shaft to which the rotating force of an engine is input, an output shaft for outputting a driving force to a drive wheel side, a shift gear mechanism provided between the input and output shafts, and engaging elements utilizing friction, such as clutches, brakes, etc. The engaging elements are selectively operated to provide a predetermined speed ratio by means of the shift gear mechanism. These engaging elements are actuated by a fluid pressure, more particularly, by operating oil supplied thereto in accordance with a shift command from a selector lever of the vehicle or a shift command based on the operating conditions of the vehicle. Thus, rotating elements in the shift gear mechanism are appropriately selected, whereby a desired shifting is carried out manually or automatically.

In the automatic transmission described above, when the selector lever is shifted from the neutral position to the reverse position, a front clutch and a low/reverse brake (L/R brake) are selected from among a plurality of engaging elements and operated. Moreover, when the L/R brake is operated, the pressure of the operating oil supplied to the L/R brake, i.e., the L/R supply pressure, is controlled in accordance with a preset control pattern. By doing this, the response characteristic of the shifting of the automatic transmission from the neutral position to the reverse position is improved and shifting shock is reduced. Specifically, the L/R supply pressure for the L/R brake is controlled by a pressure control solenoid valve, which is subjected to duty control, and a neutral/reverse control valve.

The above-mentioned control pattern generally comprises a precontrol pattern executed in a preliminary stage from the input of a shift command until play in the mechanism of the engaging element, i.e., the L/R brake, is eliminated, and a main control pattern for actually operating the L/R brake in an engagement stage subsequent to the precontrol pattern. In these control patterns, the duty factor of the pressure control solenoid valve is defined appropriately in relation to the lapse of time.

Nevertheless, since the control patterns for controlling the L/R supply pressure of the L/R brake are not prepared for each of automatic transmissions, but are used in common, the relationship between the duty factor of the pressure control valve and the L/R supply pressure differs from one automatic transmission to another. Accordingly, when the L/R supply pressure is controlled in accordance with the control patterns, play in the mechanism of the L/R brake may not be eliminated even after the precontrol pattern is finished, or conversely, the L/R brake may be operated actually before the completion of the precontrol pattern. Thus, when the L/R supply pressure is thereafter controlled in accordance with the main control pattern, a variation occurs in the shift start time between the start of the main control pattern and the start of an actual shifting of the automatic transmission, making it difficult to stabilize the response characteristic of shifting.

Furthermore, since the duty factor of the pressure control valve at the start of controlling the L/R supply pressure in accordance with the main control pattern, i.e., at an initial stage of engagement, is set at a fixed value, the value of the L/R supply pressure at the initial stage of engagement also differs from one automatic transmission to another. Therefore, if the L/R supply pressure is too high at the initial stage of engagement, a peak occurs in the torque variation of the output shaft during the period between the start of a shifting of the automatic transmission and the end of same, and thus, the feeling at shifting is lowered. Conversely, if the L/R supply pressure at the initial stage of engagement is too low, the shifting of the automatic transmission is delayed.

SUMMARY OF THE INVENTION

This invention was created in view of the abovedescribed circumstances, and an object thereof is to provide a shift control method for an automatic transmission of an automotive vehicle which is able to improve the response characteristic of shifting of the automatic transmission, stabilize the torque variation of the output shaft of the transmission, and thus reduce a shifting shock of the transmission.

To achieve the above object, according to the shift control method for an automatic transmission of an automotive vehicle of this invention, a storing means previously stores a control pattern for controlling a fluid pressure supplied to an engaging element at shifting of the automatic transmission both in a preliminary stage for eliminating a play in the mechanism of the engaging element and in an engagement stage for executing a substantial engaging action of the engaging element following the preliminary stage, like the conventional shift control method described above.

According to the shift control method of this invention, in contrast, a factor defining the control pattern for the preliminary stage is corrected on the basis of the difference between the time required from the start of the engagement stage to the start of a substantial shifting of the automatic transmission and an ideal reference time. More specifically, in the case in which the shift starting point is deviated from an ideal reference starting point of time during a previous shifting of the automatic transmission, the factor defining the control pattern for the preliminary stage (e.g., the time of continuance of the control pattern) is corrected by learning. Accordingly, at the next shifting of the automatic transmission, the control pattern of the preliminary stage is determined on the basis of the corrected factor. As a result, when the shifting of the automatic transmission is effected next, the fluid pressure supplied to the engaging element is controlled in accordance with the newly determined control pattern for the preliminary stage, and therefore, the play in the mechanism of the frictional engaging element is appropriately and reliably eliminated by the end of the preliminary stage. Thus, when the transmission thereafter proceeds to the engagement stage subsequent to the preliminary stage, the shift starting point can be stably maintained at the ideal reference starting point during the engagement stage.

Furthermore, the shift control method of this invention takes into account the rotational speed of the input shaft of the automatic transmission during the period from the start of shifting of the transmission to the end of same, and the initial value of the fluid pressure supplied to the engaging element is controlled at the start of the engagement stage on the basis of the difference between the rate of change of the rotational speed of the input shaft and an ideal reference rate. Specifically, in the case in which the rate of change of the rotational speed of the input shaft is deviated from the reference rate during a previous shifting of the automatic transmission, the initial value of fluid pressure is corrected by learning such that the actual rate of change coincides with the reference rate. Accordingly, when the engagement stage is initiated at the next shifting of the automatic transmission, the initial value of fluid pressure has been corrected, whereby the fluid pressure actually supplied to the engaging element is made suitable. As a result, during the engagement stage, the rate of change of the rotational speed of the input shaft between the start of a shifting and the end of same can be stably maintained at the reference rate, and the torque variation of the output shaft can also be stabilized.

DETAILED DESCRIPTION OF THE PREFERRED EMBODIMENTS

Figure 1:
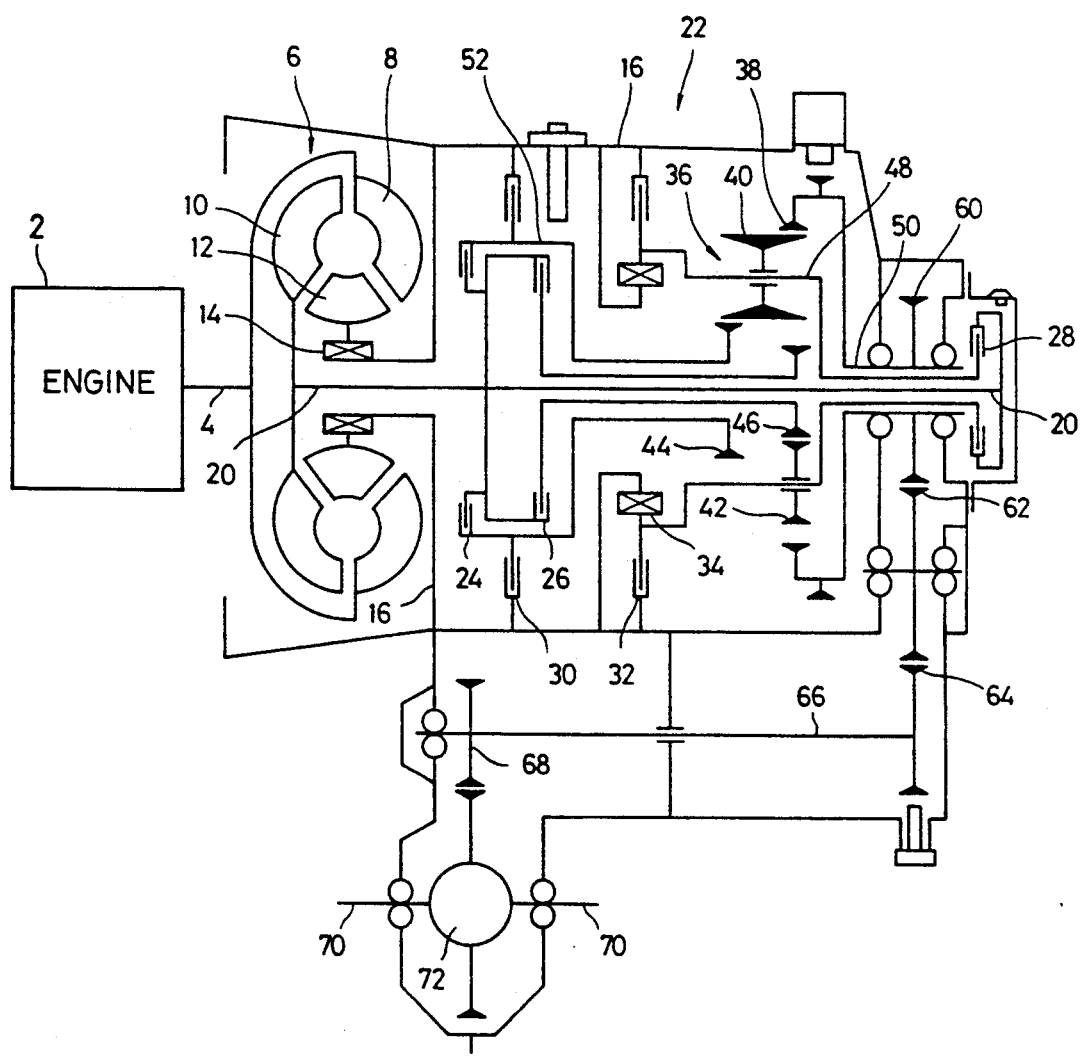
FIG. 1 is a diagram schematically showing the arrangement of an automatic transmission.

Referring to FIG. 1, there is illustrated an example of an automatic transmission for an automotive vehicle. The vehicle has an engine 2 whose crankshaft 4 is connected to the automatic transmission. Specifically, the automatic transmission includes a torque converter 6 of which pump 8 is directly coupled to the crankshaft 4 of the engine 2. The torque converter 6 further includes, in addition to the pump 8, a turbine 10 and a stator 12, the stator 12 being connected to a case 16 through a one-way clutch 14. The one-way clutch 14 permits the stator 12 to rotate in the same direction as the crankshaft 4, but inhibits same from rotating in the opposite direction.

Torque transferred to the turbine 10 of the torque converter 6 is first transmitted to an input shaft 20, and then to a shift gear mechanism 22 through the input shaft 20. The shift gear mechanism 22 has a construction such that it provides four forward speeds and one reverse speed.

The shift gear mechanism 22 including three sets of clutches 24, 26 and 28, two sets of brakes 30 and 32, a set of one-way clutch 34, and one set of Ravigneaux planetary gear train 36.

The planetary gear train 36 comprises a ring gear 38, a long pinion gear 40, a short pinion gear 42, and a carrier 48 rotatably supporting the pinion gears 40 and 42. The carrier 48 itself is rotatably supported, and the ring gear 38 is coupled to an output shaft 50. A front sun gear 44 is coupled to the input shaft 20 through a kickdown drum 52 and a front clutch 24, and a rear sun gear 46 is coupled to the input shaft 20 through a rear clutch 26.

The aforesaid carrier 48 is connected to the case 16 through a low/reverse brake (hereinafter referred to as L/R brake) 32 and a one-way clutch 34 which are arranged in parallel in terms of function, and is also connected to the input shaft 20 through a 4th speed clutch 28 arranged at the rear end of the shift gear mechanism 22.

The kickdown drum 52 can be firmly connected to the case 16 by a kickdown brake 30.

Torque transmitted from the input shaft 20 to the output shaft 50 through the planetary gear train 36 is transferred to an output gear 60 integrally coupled with the output shaft 50, and then transmitted from the output gear 60 to a driven gear 64 through an idle gear 62. The torque transmitted to the driven gear 64 is then further transmitted to a differential gear 72 through a transfer shaft 66 to which the driven gear 64 is mounted, and a helical gear 68 mounted to the transfer shaft 66. Drive shafts 70 for the drive wheels of the vehicle are coupled to the differential gear 72.

The clutches and brakes, which serve as engaging elements of the automatic transmission, are individually associated with hydraulic actuators having piston, servo mechanism, or the like for engagement. Each actuator is operated by the oil pressure generated by an oil pump (not shown). The oil pump is coupled to the engine 2 through the pump 8 of the torque converter 6, so that it is driven by the engine 2.

The operating oil from the oil pump is selectively supplied to the clutches and brakes by a hydraulic control device, described later, in accordance with the operating conditions of the engine 2, and one of the four forward speeds and one reverse speed is selected in the automatic transmission in basis of the operational combination of the clutches and brakes.

For example, when the selector lever of the automatic transmission is shifted from a neutral position to a reverse position, the front clutch 24 and the L/R brake 32 are operated. When, on the other hand, the selector lever of the automatic transmission is shifted from the neutral position to a drive position, the rear clutch 26 is operated.

Figure 2:
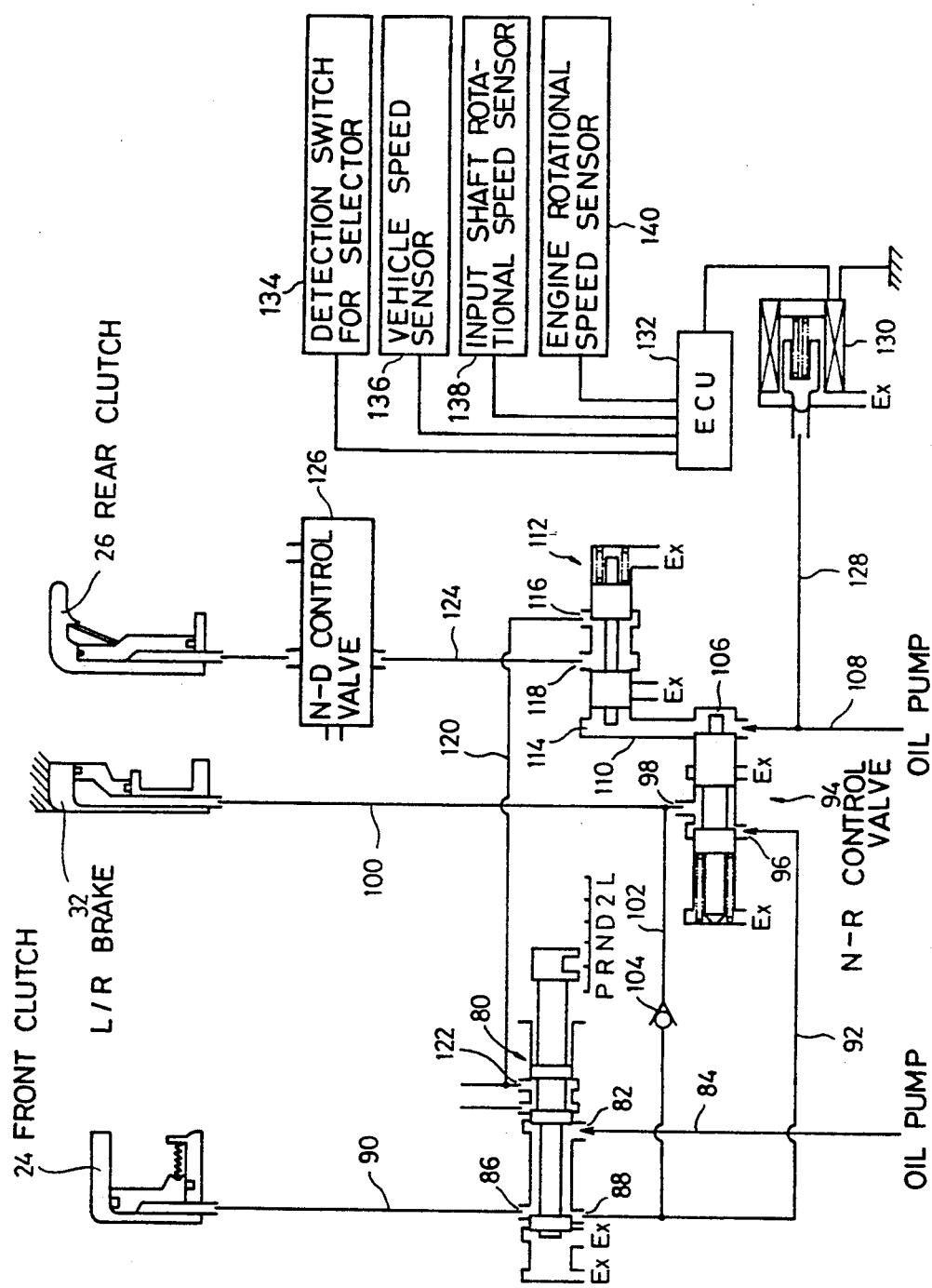
FIG. 2 is a schematic diagram of a hydraulic circuit including a front clutch, a low/reverse brake, and a rear clutch.

Referring now to FIG. 2, there is schematically illustrated an electronic-hydraulic control circuit for supplying an operating oil to the front clutch 24, the L/R brake 32, and the rear clutch 26. The entire arrangement and operation of the electronic-hydraulic control circuit are known in the art, as disclosed in, e.g., Unexamined Japanese Patent Publication No. 58-46258, and therefore, the part of the electronic-hydraulic control circuit operationally associated with the other brakes and clutches is omitted from FIG. 2.

The electronic-hydraulic control circuit includes a manual valve 80 which is operated by the selector lever of the automatic transmission. The manual valve 80 has an inlet port 82 connected to an oil passage 84. The oil passage 84 is supplied with an operating oil of regulated pressure from the aforementioned oil pump. The regulation of the operating oil pressure is effected by a regulator valve, not shown.

The manual valve 80 further has outlet ports 86, 88 and 122. The outlet port 86 is connected to the front clutch 24 through an oil passage 90, and the outlet port 88 is connected to an inlet port 96 of an N-R control valve 94 through an oil passage 92.

An outlet port 98 of the N-R control valve 94 is connected to the L/R brake 32 through an oil passage 100. An oil passage 102 branches off from a portion of the oil passage 100 close to the outlet port 98, and is connected to the aforesaid oil passage 92. A check valve 104 is provided in the branch passage 102, to allow the operating oil to flow from the oil passage 102 toward the oil passage 92 only.

Further, the N-R control valve 94 has a control chamber 106, which is located at the right-hand end of the valve 94, as viewed in FIG. 2. The control chamber 106 is connected to the oil pump through an oil passage 108, and thus is supplied with the operating oil of regulated pressure from the oil pump.

The control chamber 106 is connected also to a pressure control valve 112, i.e., a control chamber 114 of same, through an oil passage 110. The control chamber 114 is located at the left-hand end of the pressure control valve 112, as viewed in FIG. 2. The pressure control valve 112 has an inlet port 116 and an outlet port 118. The inlet port 116 is connected to an outlet port 122 of the manual valve 80 through an oil passage 120, and the outlet port 118 is connected to the rear clutch 26 through an oil passage 124. An N-D control valve 126, indicated by block in the figure, is arranged midway in the oil passage 124.

In practice, various shift valves, control valves, etc. are arranged in the oil passages 90, 100 and 124, but are omitted from FIG. 2. In the valves illustrated in FIG. 2, symbol $E_x$ denotes an exhaust port which is connected to an oil pan, not shown.

An oil pressure control passage 128 branches off from an intermediate portion of the aforesaid oil passage 108, and is connected to the oil pan. A pressure control solenoid valve (PCSV) 130 is provided in the oil pressure control passage 128. The PCSV 130 controls, through the oil passage 128, the pressures supplied to the control chambers 106 and 114 of the N-R control valve 94 and pressure control valve 112. Specifically, the PCSV 130 is electrically connected to an electronic control unit (ECU) 132 and is subjected to duty control thereby. Therefore, when the PCSV 130 is subjected to duty control, the operating oil in the oil passage 108 and control chambers 106 and 114 is discharged to a low-pressure side through the exhaust port $E_x$ of the PCSV 130, and thus, the pressure in the control chambers 106 and 114 is controlled to a pressure level corresponding to the duty factor for the PCSV 130.

The pressure in the control chambers 106 and 114, controlled in the above manner, acts upon the right end face of the spool of the N-R control valve 94 and the left end face of the spool of the pressure control valve 112, respectively.

When the manual valve 80 is shifted from the neutral position to the reverse position, as illustrated in FIG. 2, an internal passage interconnecting the inlet port 82 and outlet ports 86 and 88 of the manual valve 80 is open. Accordingly, the operating oil delivered to the inlet port 82 of the manual valve 80 is supplied to the front clutch 24 through the outlet port 86 and the oil passage 90, whereby the front clutch 24 is immediately operated.

The operating oil delivered to the manual valve 80 is also supplied to the inlet port 96 of the N-R control valve 94 through the outlet port 88 and the oil passage 92, and then is further supplied from this inlet port 96 to the L/R brake 32 through the outlet port 98 of the valve 94 and the oil passage 100, whereby the L/R brake 32 is also made operative. In this case, since the control pressure in the control chamber 106 acts upon the right end face of the spool of the N-R control valve 94, as mentioned above, the spool of the N-R control valve 94 is moved to a position where the control pressure is balanced with the urging force of the valve spring of the valve 94. Therefore, in the N-R control valve 94, the openings of the inlet port 96 and exhaust port $E_x$, are adjusted by land portions formed on the spool thereof. Thus, the L/R supply pressure supplied to the L/R brake 32 through the N-R control valve 94 is determined by the valve opening of the N-R control valve 94, i.e., the duty factor for the PCSV 130, and accordingly, the operation of the L/R brake 32 can be controlled. In this embodiment, the oil pressure in the outlet port 98 has a characteristic such that it is proportional to the oil pressure in the control chamber 106 which is determined by the duty factor of the PCSV 130. Namely, when the duty factor of the PCSV 130 is 0% (PCSV 130 is fully closed), the oil pressure in the outlet port 98 is a maximum (equal to the line pressure supplied to the oil passage 92), and when the duty factor for the PCSV 130 is 100% (PCSV 130 is fully opened), the oil pressure in the outlet port 98 is a minimum (almost 0 $kg/cm^2$).

When the manual valve 80 is in the reverse position, the communication between the inlet port 82 and the outlet port 122 is blocked, and in this case, the operating oil is not supplied through the manual valve 80 to the pressure control valve 112.

The aforementioned ECU 132 includes not only a control circuit for controlling the opening/closing action of the PCSV 130 by duty control, but also a control circuit for outputting a shift command in accordance with the shifted position of the selector lever, or in accordance with the operating conditions of the vehicle when the selector lever is in the drive position.

Therefore, the ECU 132 is supplied with signals from various sensors, switches, etc., which include, for example, a detection switch (inhibitor switch) for detecting the shifted position of the selector lever, a speed sensor for detecting the rotational speed of the engine 2, a throttle opening sensor for detecting the throttle opening of the engine 2, a speed sensor for detecting the rotational speed of the input shaft 20, a speed sensor for detecting the rotational speed of the output shaft 50, a vehicle speed sensor, an oil temperature sensor for detecting the temperature of the lubricating oil in the automatic transmission, an ignition key switch, an idle switch, and a parking brake switch. Among these sensors and switches, only the detection switch 134, the vehicle speed sensor 136, the input shaft rotational speed sensor 138, and the engine rotational speed sensor 140 are shown in FIG. 2.

Next, referring to FIG. 3 and the subsequent drawings, a shift routine executed when the automatic transmission is in the neutral position and the selector lever is then shifted to the reverse position, i.e., an N-R shift routine, will be explained.

N-R Shift Routine

Figure 3:
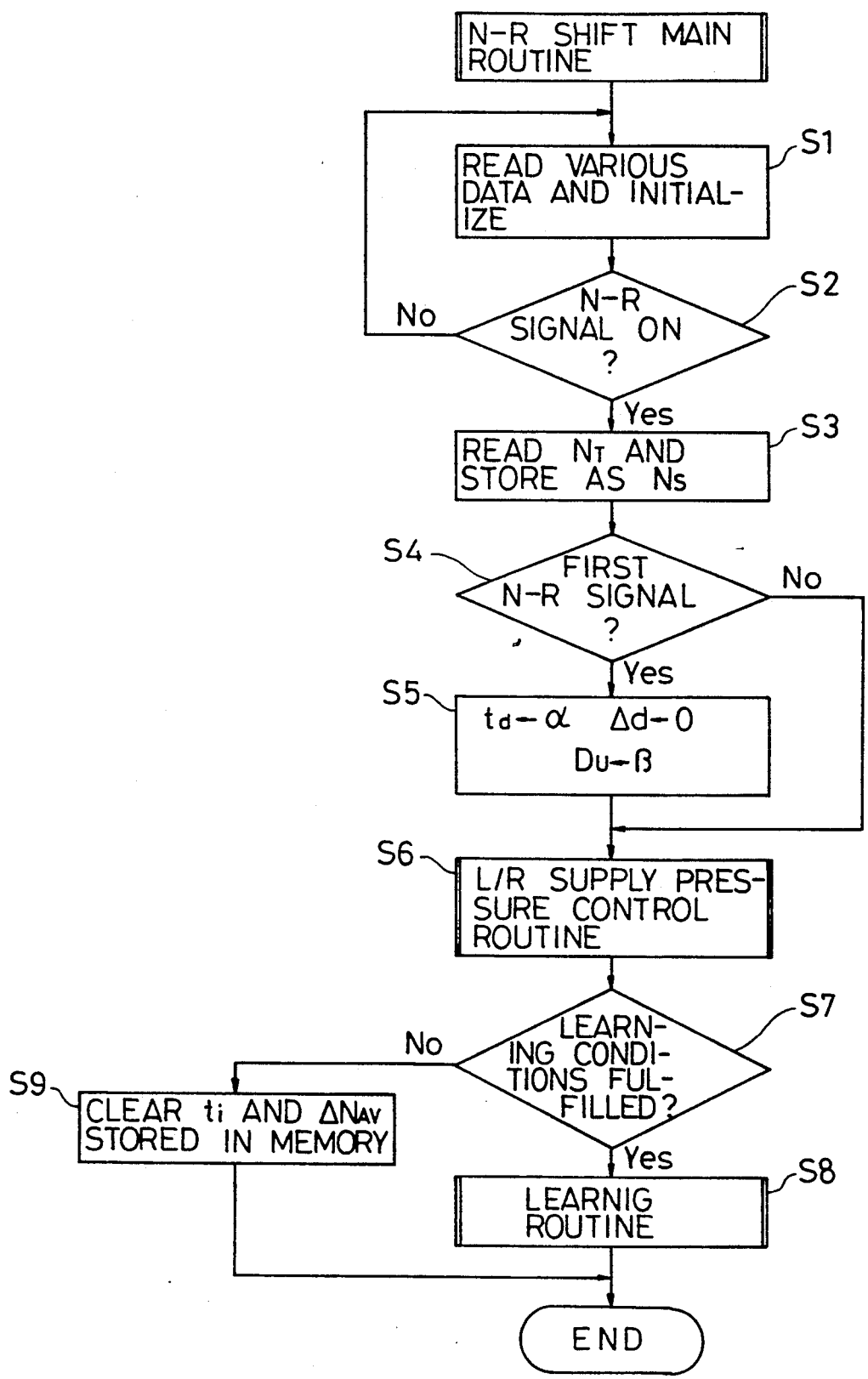
FIG. 3 is a flowchart illustrating an N-R shift main routine.

FIG. 3 shows a flowchart of a main routine of the N-R shift routine. As shown in the flowchart, in Step S1, data is read from the aforementioned various sensors and switches, and the ECU 132 is initialized appropriately.

In Step S2, it is determined whether or not the selector lever has been shifted from the neutral position to the reverse position, that is, an N-R signal has been output from the detection switch 134. If the result of the determination is No, the program returns to Step S1. If, on the other hand, the result of the determination is Yes, the program proceeds to Step S3, in which the value of rotational speed $N_T$ of the input shaft 20 is read and stored in an unillustrated memory as $N_S$. In the next Step S4, it is determined whether or not the N-R signal is the first N-R signal output after the ECU 132 was connected to the power supply. If the result of this determination is Yes, Step S5 is executed, and if the result is No, the program skips Step S5 and executes Step S6 immediately. Accordingly, Step S5 is executed only once in the first cycle.

In Step S5, initial values which define a control pattern for an L/R supply pressure in the control routine executed in Step S6 and initial values for a learning routine which is executed in Step S8 when it is determined in Step S7 that learning conditions are fulfilled are individually set. More specifically, an initial value $\alpha$ (e.g., 0.15 sec) is set for a correction time $t_d$, an initial value $\beta$ (e.g., 80%) is set for a duty factor $D_u$ used for initial stage of engagement, and zero is set for a correction amount $\Delta d$ for the duty factor $D_u$. The initial value, correction time and correction amount are mentioned latter.

The initial value of the duty factor $D_u$ for the initial stage of engagement may be varied in accordance with the temperature of the lubricating oil in the automatic transmission. The values of the correction time $t_d$, duty factor $D_u$ and correction amount $\Delta d$ are stored in a nonvolatile memory so that they can be retained even if the ignition key of the engine 2 is turned off.

If the result of the determination in Step S7 is No, the program executes Step S9, instead of Step S8. In Step S9, the values of shift start time $t_1$ and average changing rate $\Delta N_{AV}$ of rotational speed, which are stored in a memory when the L/R supply pressure control routine is executed in Step S6, as described later, are cleared.

Figure 4:
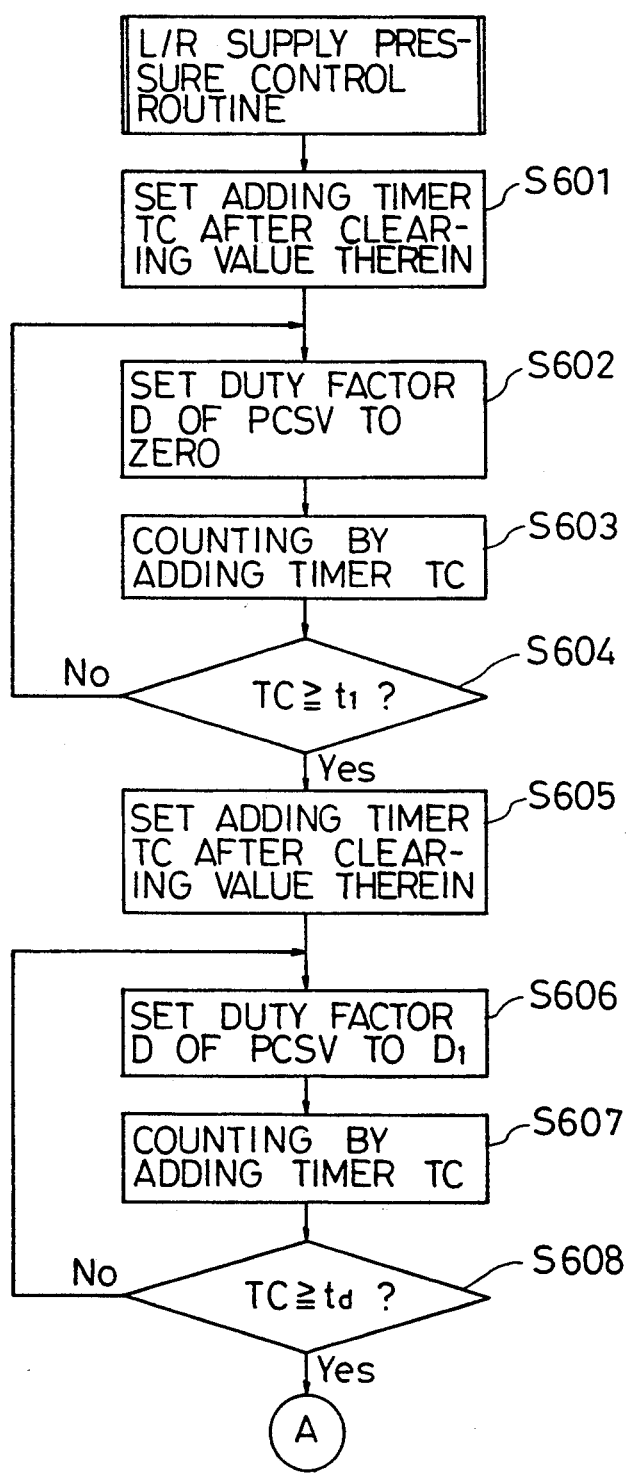
FIG. 4 to FIG. 6 are flowcharts illustrating a control routine for L/R supply pressure of the low/reverse brake.
Figure 5:
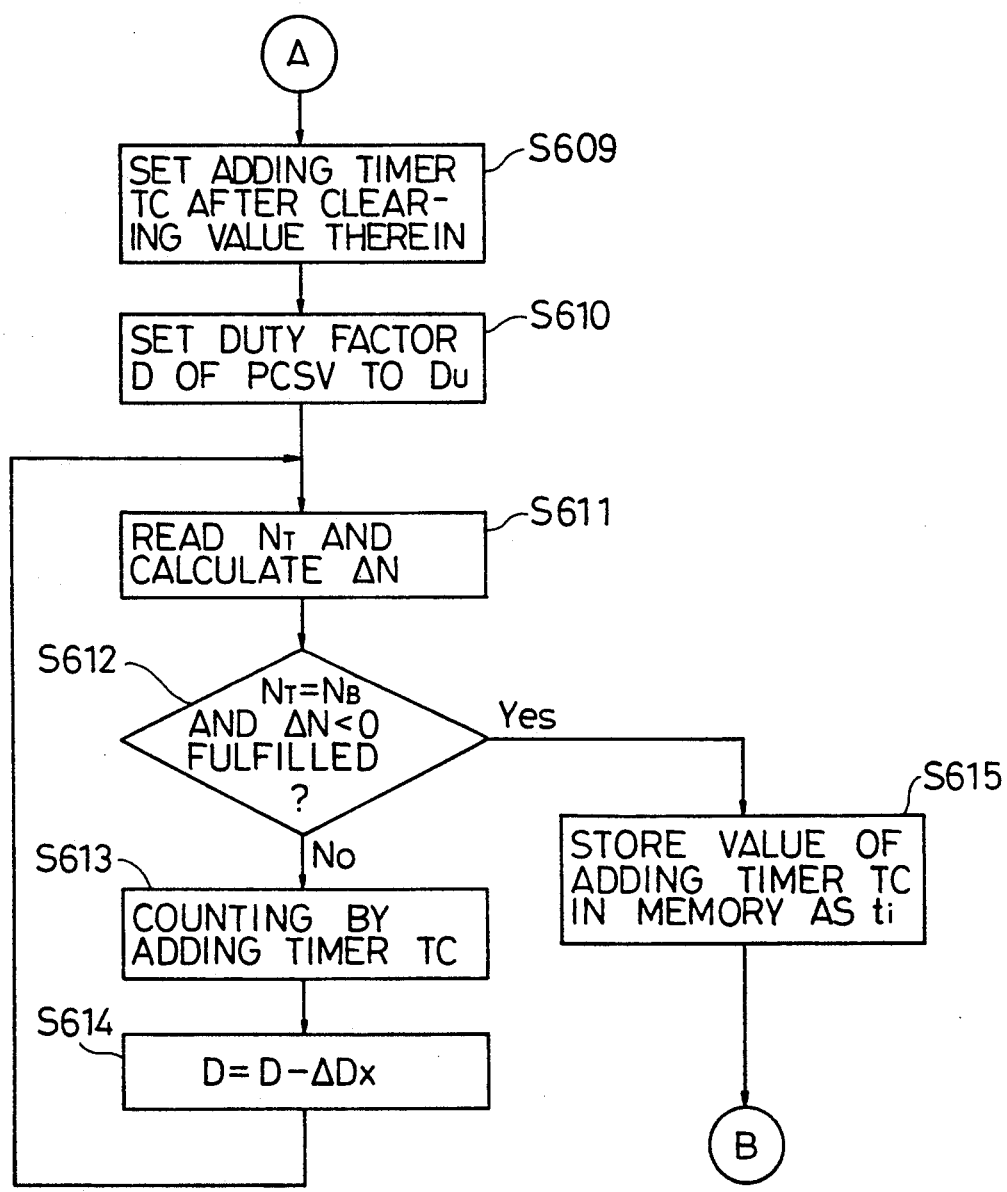
Figure 6:
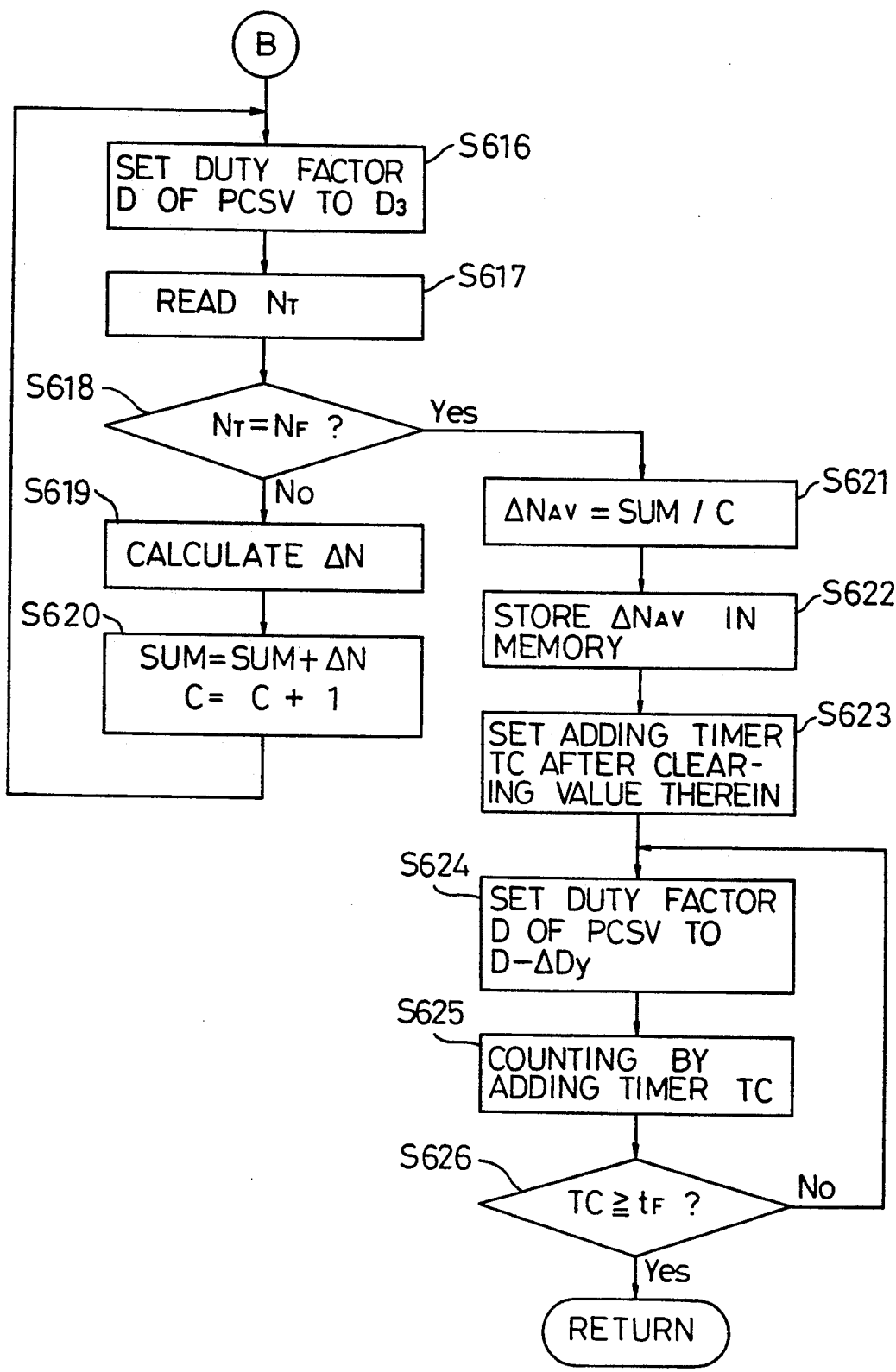

FIG. 4 to FIG. 6 are flowcharts illustrating the e control routine for L/R supply pressure.

First, in Step S601 of FIG. 4, an adding time TC is set after the value therein is cleared to zero, whereby the timer TC is ready for operation. In the next Step S602, 0% is set for the duty factor D of the PCSV 130. The adding timer TC is thereafter operated and the value therein is incremented (Step S603).

After Step S603 is executed, it is determined in Step S604 whether or not the value in the adding timer TC has reached a value corresponding to a preliminary time period $t_1$. If the result of the determination is No, the program returns to Step S602, and this step and the subsequent steps are repeatedly executed until the result of the determination in Step S604 becomes Yes. Accordingly, the duty factor D of the PCSV 130 is maintained at 0% during the preliminary time $t_1$ after the N-R signal is output, as is seen from the duty factor control pattern shown in FIG. 7. During the preliminary time $t_1$, therefore, the valve opening of the N-R control valve 94 remains fully open, whereby the operating oil is quickly supplied to the L/R brake 32.

When the result of the determination in Step S604 becomes Yes and thus the program proceeds to Step S605, the value in the adding timer TC is set to zero and then the timer TC is set again. Subsequently, the duty factor D of the PCSV 130 is set to $D_1$ (Step S606). $D_1$ is set, for example, to 40%.

In the next Step S607, the adding timer TC is operated and the value therein is incremented, as in Step S603. It is then determined whether or not the value in the adding timer TC has reached a value corresponding to the correction time $t_d$ (Step S608).

Figure 7:
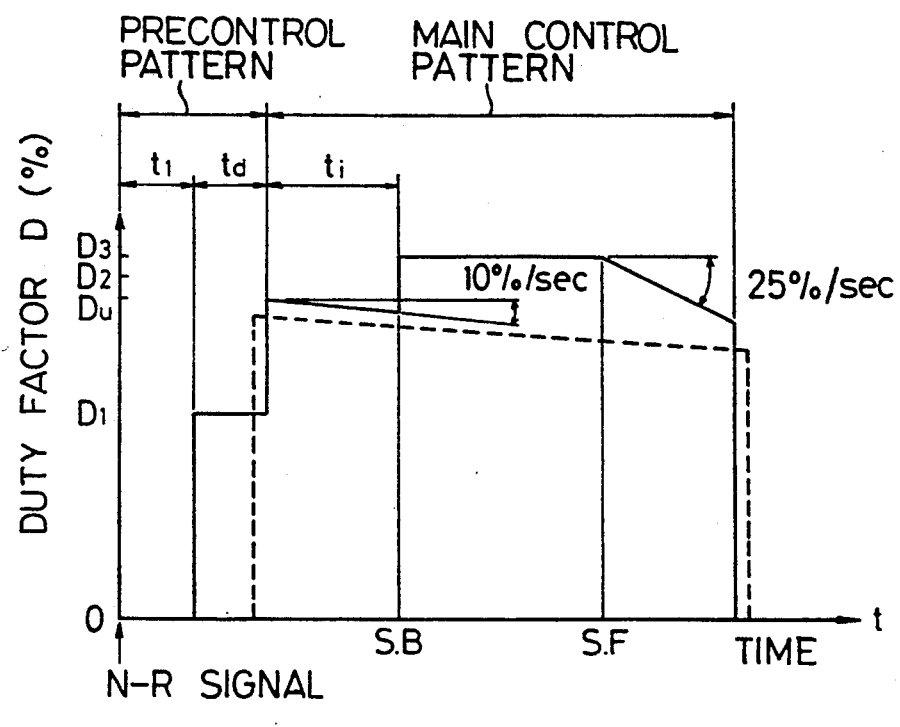
FIG. 7 is a graph showing an entire control pattern including a precontrol pattern and a main control pattern.

If the result of the determination in Step S608 is No, Step S606 and the subsequent steps are repeatedly executed until the result of the determination in Step S608 becomes Yes, and thus, the duty factor D of the PCSV 130 is maintained at $D_1$, as shown in FIG. 7. Accordingly, the valve opening of the N-R control valve 94 is maintained at an opening corresponding to the duty factor $D_1$ and the operating oil having a pressure corresponding to this valve opening is supplied to the L/R brake 32.

The preliminary time $t_1$ and the correction time $t_d$ after the output of an N-R signal define a precontrol pattern serving as a preliminary stage of shifting. Since Step S5 of the aforementioned main routine has been executed before the L/R supply pressure control routine is executed for the first time, and accordingly, the value of the correction time $t_d$ has been set to $\alpha$.

By the time the result of the determination in Step S608 becomes Yes, that is, while the duty factor D of the PCSV 130 is controlled in accordance with the precontrol pattern, the internal pressure of the L/R brake 32 is increased as the operating oil is supplied to the brake 32 through the N-R control valve 94. Therefore, play in the mechanism of the L/R brake 32 is eliminated, and charging of the operating oil for performing the lost motions of the brake 32 is completed.

After the program proceeds from Step S608 to Step S609 in FIG. 5, the duty factor D of the PCSV 130 is controlled in accordance with a main control pattern for engagement stage as shown in FIG. 7.

Specifically, in Step S609, the adding timer TC is set again after the value therein is cleared to zero. Then, the duty factor $D_u$ for the initial stage of engagement is set as the duty factor D of the PCSV 130 (Step S610).

Like the correction time $t_d$, the duty factor $D_u$ for the initial stage of engagement has been set to $\beta$ before the L/R supply pressure control routine is executed for the first time.

In the next Step S611, the rotational speed $N_T$ of the input shaft 20 is read, and the rate $\Delta N$ of change of the rotational speed $N_T$ is calculated. Specifically, the rate ΔN of change of the rotational speed $N_T$ is obtained by subtracting the previously detected rotational speed from the currently detected rotational speed.

After the rotational speed $N_T$ and the rate ΔN of change thereof are calculated in this manner, it is determined in Step S612 whether or not the rotational speed $N_T$ has reached a predetermined value $N_B$ ($N_B < N_S$, $N_B = 0.8\ N_S$, $N_S$ represents the rotational speed of the input shaft 20 at the time when the N-R signal was output) and at the same time the rate ΔN of change is smaller than zero. If the control according to the main control pattern has just started and Step S612 is executed for the first time, the play in the mechanism of the L/R brake 32 has merely been eliminated and the brake 32 is not yet substantially operated at this stage. In this case, the result of the determination in Step S612 becomes No, because the rotational speed $N_T$ of the input shaft 20 has been maintained at the rotational speed at the time of output of the N-R signal, and in the subsequent Step S613, the adding timer TC is operated and the value therein is incremented. After Step S613 is executed, the program proceeds to Step S614, in which the value of the duty factor D is decreased by a predetermined value $\Delta D_X$. The program then returns to Step S611, and this step and the subsequent steps are repeatedly executed. The predetermined value $\Delta D_X$ is set to a value such that the duty factor D is reduced at a predetermined rate, for example, at a rate of 10%/sec after the start of the main control pattern, as shown in FIG. 7.

Figure 8:
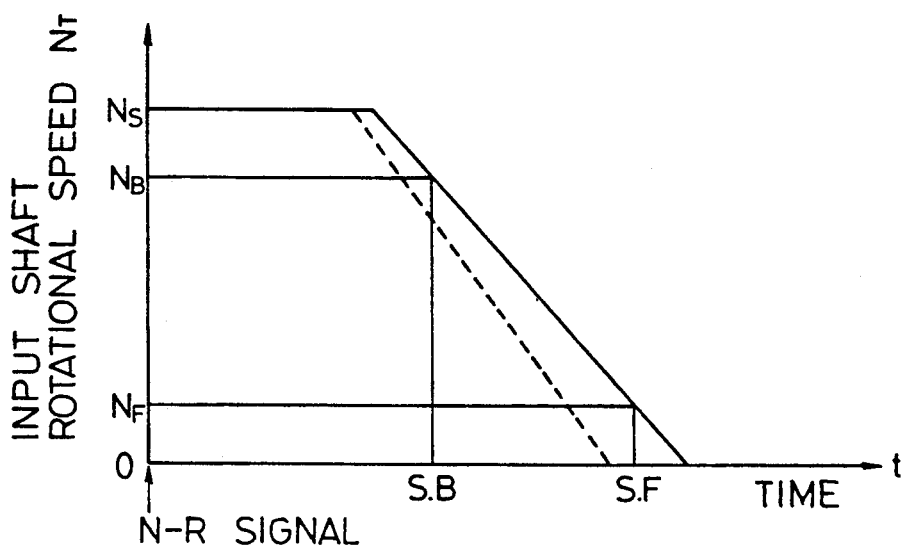
FIG. 8 is a graph showing changes of rotational speed of the input shaft of the automatic transmission when the supply pressure to the low/reverse brake is controlled in accordance with the control pattern of FIG. 7.
Figure 9:
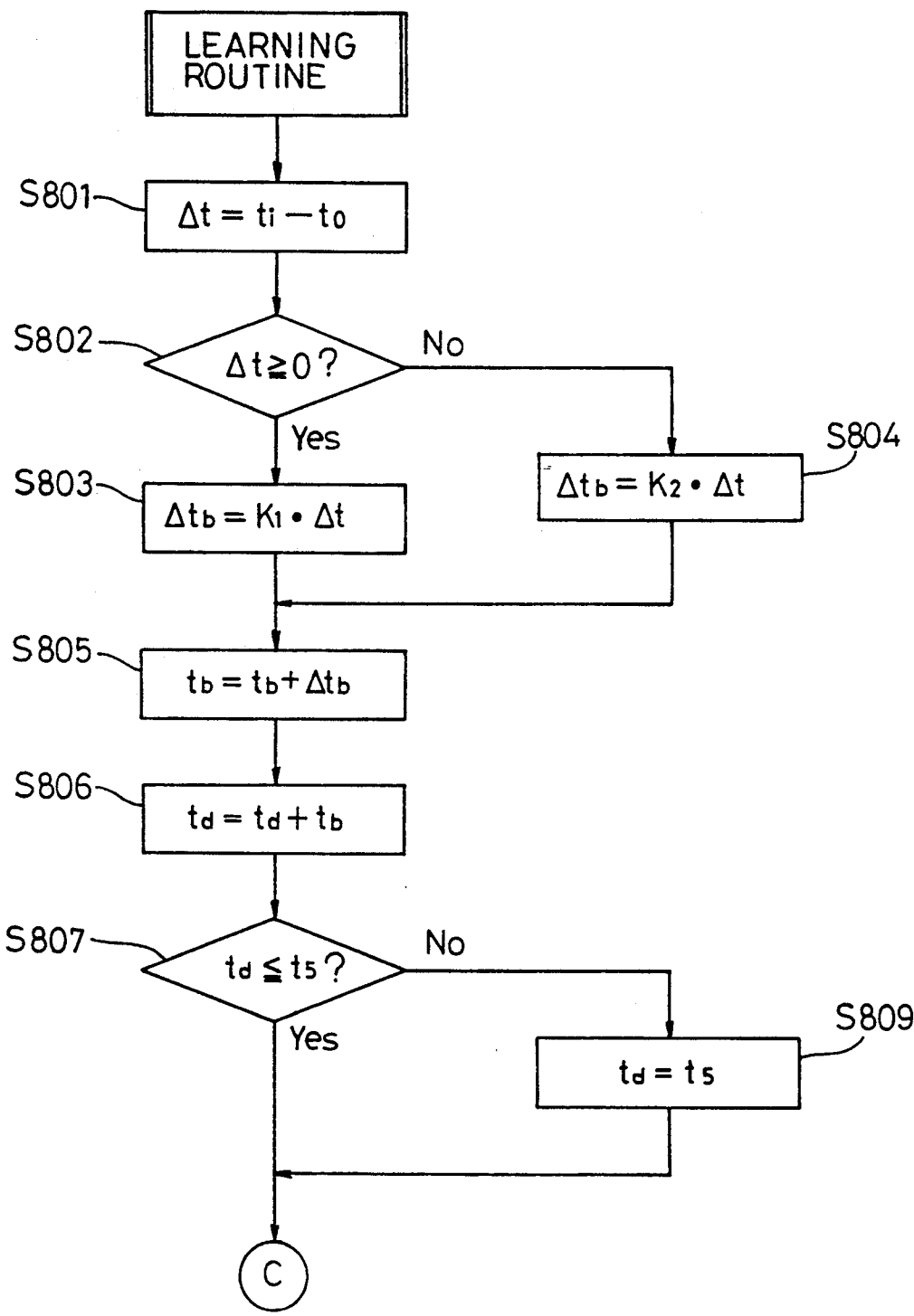
FIG. 9 to FIG. 12 are flowcharts illustrating a learning routine.

If, during the repetition of Steps S611 through S614, the L/R supply pressure to the L/R brake 32 is increased and the rotational speed $N_T$ of the input shaft 20 decreases to $N_B$, as shown in FIG. 8, so that a shift starting point of time S.B is reached, the result of the determination in Step S612 becomes Yes. In this case, the program proceeds from Step S612 to Step S615.

In Step S615, the value in the adding timer TC, i.e., the shift start time $t_1$ equivalent to the interval between the start of the main control pattern and the shift starting point S.B, is stored in a memory, not shown.

After executing Step S615, the program proceeds to Step S616 of FIG. 6, in which the duty factor D is set to a predetermined value $D_3$. The predetermined value $D_3$ is set, e.g., to $D_u \cdot M$ (M>1) on the basis of the duty factor $D_u$ for the initial stage of engagement, for example.

In Step S617 following Step S616, the rotational speed $N_T$ of the input shaft 20 is read, and then it is determined whether or not the rotational speed $N_T$ has decreased to a predetermined value $N_F$ (Step S618). The predetermined value $N_F$ is set to a value considerably smaller than $N_B$, for example, 200 rpm.

If the result of the determination in Step S618 is No, the program proceeds to Step S619, in which the rate ΔN of change of the rotational speed $N_T$ is calculated in the aforementioned manner. Then, in Step S620, the rate ΔN of change is added to the value in an accumulating counter SUM, and the value in an occurrence counter C is incremented by 1. The program then returns to Step S616, and this step and the subsequent steps are repeatedly executed. Before Step S620 is executed for the first time, an initial value of zero is set for each of the accumulating counter SUM and the occurrence counter C.

Therefore, as long as the result of the determination in Step S618 is No, the duty factor D is maintained at the fixed value $D_3$, as shown in FIG. 7, the rate ΔN calculated in Step S619 is added successively to the value in the accumulating counter SUM, and the number of additions is counted by the occurrence counter C.

While the program repeatedly executes Steps S616 through S620, the rotational speed $N_T$ of the input shaft 20 is reduced due to an increase of the L/R supply pressure and the result of the determination in Step S618 becomes Yes, that is, when the rotational speed $N_T$ decreases to $N_F$ and reaches a shift ending point S.F, an average changing rate $\Delta N_{AV}$ of rotational speed during the interval between the shift starting point S.B and the shift ending point S.F is calculated, in Step S621. Specifically, the average changing rate $\Delta N_{AV}$ of rotational speed is obtained from the following equation:

$$\Delta N_{AV} = SUM/C$$

In the subsequent Step S622, the average changing rate $\Delta N_{AV}$ of change of the average rotational speed is stored in a memory, not shown, and the adding timer TC is again set after the value therein is cleared to zero (Step S623). Then, in Step S624, the duty factor D of the PCSV 130 is decreased by a predetermined value $\Delta D_y$, and in Step S625 the adding timer TC is operated and the value therein is incremented. It is then determined in Step S626 whether the value in the adding timer TC is not greater than a predetermined value $t_F$. If the result of this determination is No, Step S624 and the subsequent steps are repeatedly executed, and accordingly, the duty factor D is decreased successively by the predetermined value $\Delta D_y$. The predetermined value $\Delta D_y$ is set to such a value that the duty factor D is decreased at a rate of 25%/sec after the shift ending point S.F, as shown in FIG. 7.

If the result of the determination in Step S626 becomes Yes while the process starting from Step S624 is repeated, the program returns to the aforementioned main routine shown in FIG. 3, and executes the subsequent Step S7.

In Step S7, it is determined whether or not the operating conditions of the vehicle fulfill the learning conditions, as mentioned above. The learning conditions include the following, for example:

Learning Conditions

1. The idle switch is kept on until the shift ending point S.F.
2. The rotational speed of the engine is not higher than 850 rpm, and a change of the rotational speed of the engine 2 during the period which is certain time, e.g., 2 sec, before the output of the N-R signal to a point of time preceding the output, is within ±50 rpm.
3. The temperature of the lubricating oil in the automatic transmission is within a range of 60° to 90° C.
4. The vehicle speed detected by the vehicle speed sensor is zero, and the detection switch for detecting the operation of the parking brake is off.
5. The N-R signal received is not the signal output for the first time after the ignition key is turned on. That is, the N-R signal is kept on.
6. The automatic transmission remains in the neutral position for a certain period, e.g., 2 sec, preceding the output of the N-R signal.

As is seen from the above learning conditions, when the L/R supply pressure control routine of Step S6 is executed for the first time after the ignition key is turned on, the result of the determination in Step S7 becomes necessarily No. In this case, the program proceeds to Step S9, in which the values of the shift start time $t_1$ and average changing rate $\Delta N_{AV}$ of rotational speed, stored in the memory, are cleared, as mentioned before.

If the result of the determination in Step S7 is Yes, the program proceeds to Step S8 and the learning routine is executed.

Learning Routine

The learning routine is illustrated in the flowcharts of FIGS. 9 through 12. First, in Step S801 of FIG. 9, a deviation $\Delta t$ between the shift start time $t_1$, already stored in the memory during the execution of the L/R supply pressure control routine, and a target value $t_o$ (e.g., 0.2 sec) is calculated. Then, it is determined in Step S802 whether the deviation $\Delta t$ is not greater than zero.

If the result of the determination in Step S802 is Yes, a correction amount $\Delta t_b$ is calculated from the following equation, in Step S803:

$$\Delta t_b = K_1 \cdot \Delta t$$

where $K_1$ is a constant and is set to, e.g., 0.5.

If the result of the determination in Step S802 is No, the correction amount $\Delta t_b$ is calculated according to the following equation, in Step S804:

$$\Delta t_b = K_2 \cdot \Delta t$$

where $K_2$ is a constant and is set to 1, for example.

Figure 13:
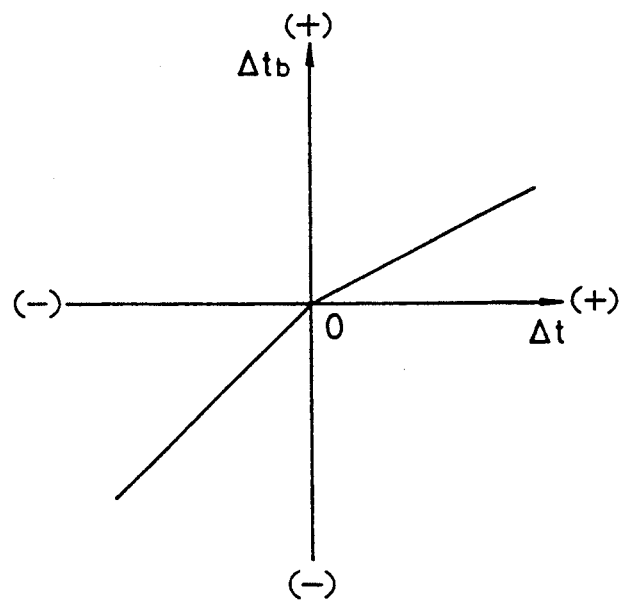
FIG. 13 is a graph showing the relationship between a deviation $\Delta t$ and a correction amount $\Delta t_b$.

Accordingly, the correction amount $\Delta t_b$, calculated in Step S803 or S804, and the deviation $\Delta t$ have a relationship as shown in FIG. 13.

After executing Step S803 or S804, the program proceeds to Step S805, in which an accumulated value $t_b$ of the correction amounts $\Delta t_b$ is obtained from the following equation:

$$t_b = t_b + \Delta t_b$$

The accumulated value $t_b$ of the correction amounts is stored in a nonvolatile memory. Before the learning routine is executed for the first time, zero is set for the initial value of the accumulated value.

Then, in Step S806, the correction time $t_d$ is calculated from the following equation, using the accumulated value $t_b$ of correction amounts:

$$t_d = t_d + t_b$$

The value of the correction time $t_d$ remains at the initial value $\alpha$ (0.15 sec) before the learning routine is executed for the first time, as mentioned earlier.

After the correction time $t_d$ is thus obtained, it is determined in Step S807 whether the correction time $t_d$ is not smaller than a predetermined time $t_5$ (e.g., 0.5 sec). If the result of this determination is Yes, the program proceeds to the next step in FIG. 10, but if the result of the determination is No, the program executes Step S809 before proceeding to Step S810 of FIG. 10. In Step S809, the predetermined time $t_5$ is set as the correction time $t_d$.

Figure 10:
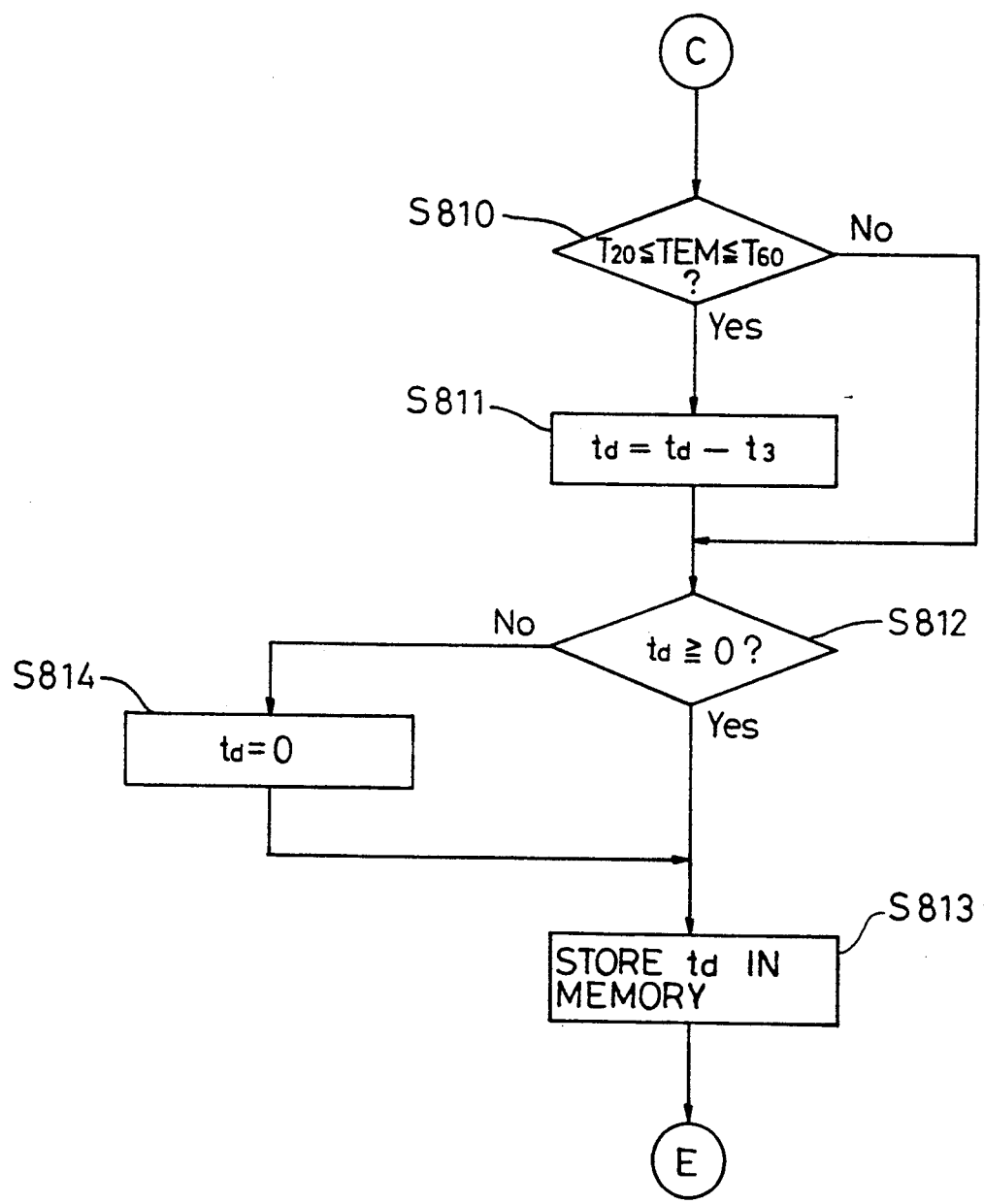

In Step S810 of FIG. 10, it is determined whether or not the temperature TEM of the lubricating oil in the automatic transmission is within a range of $T_{20}$ (e.g., 20° C.) to $T_{60}$ (e.g., 60° C.). If the result of the determination is Yes, a predetermined time $t_3$ (e.g., 0.3 sec) is subtracted from the correction time $t_d$, in Step S811, and the program proceeds to the next Step S812. If, on the other hand, the result of the determination in Step S810 is No, the program proceeds directly to Step S812.

In Step S812, it is determined whether the correction time $t_d$ is not greater than zero. If the result of the determination is Yes, the value of the correction time $t_d$ is stored in the nonvolatile memory, in Step S813, but if the result of the determination is No, zero is set as the value of the correction time $t_d$, in Step S814, before the execution of Step S813.

Figure 11:
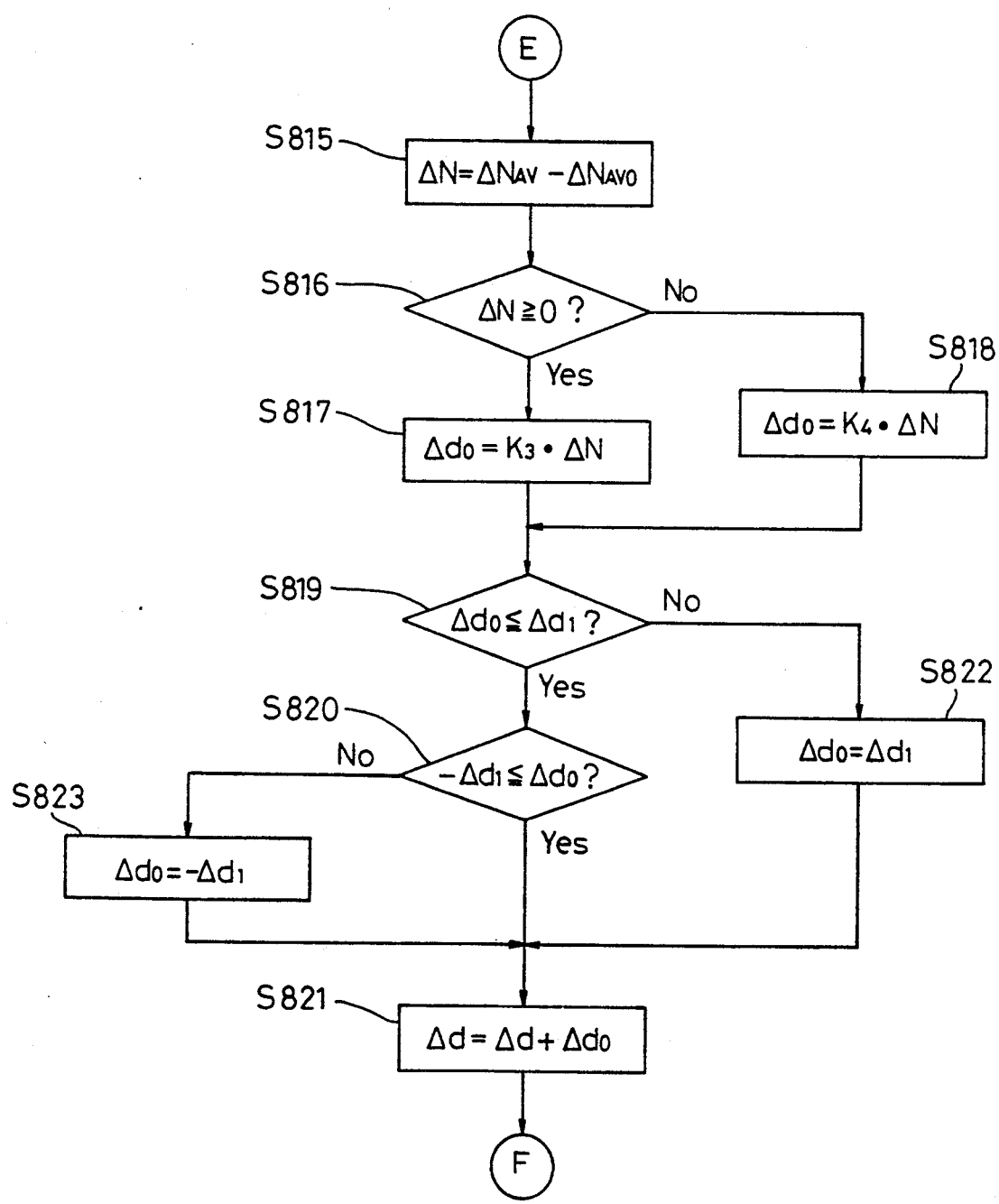
Figure 12:
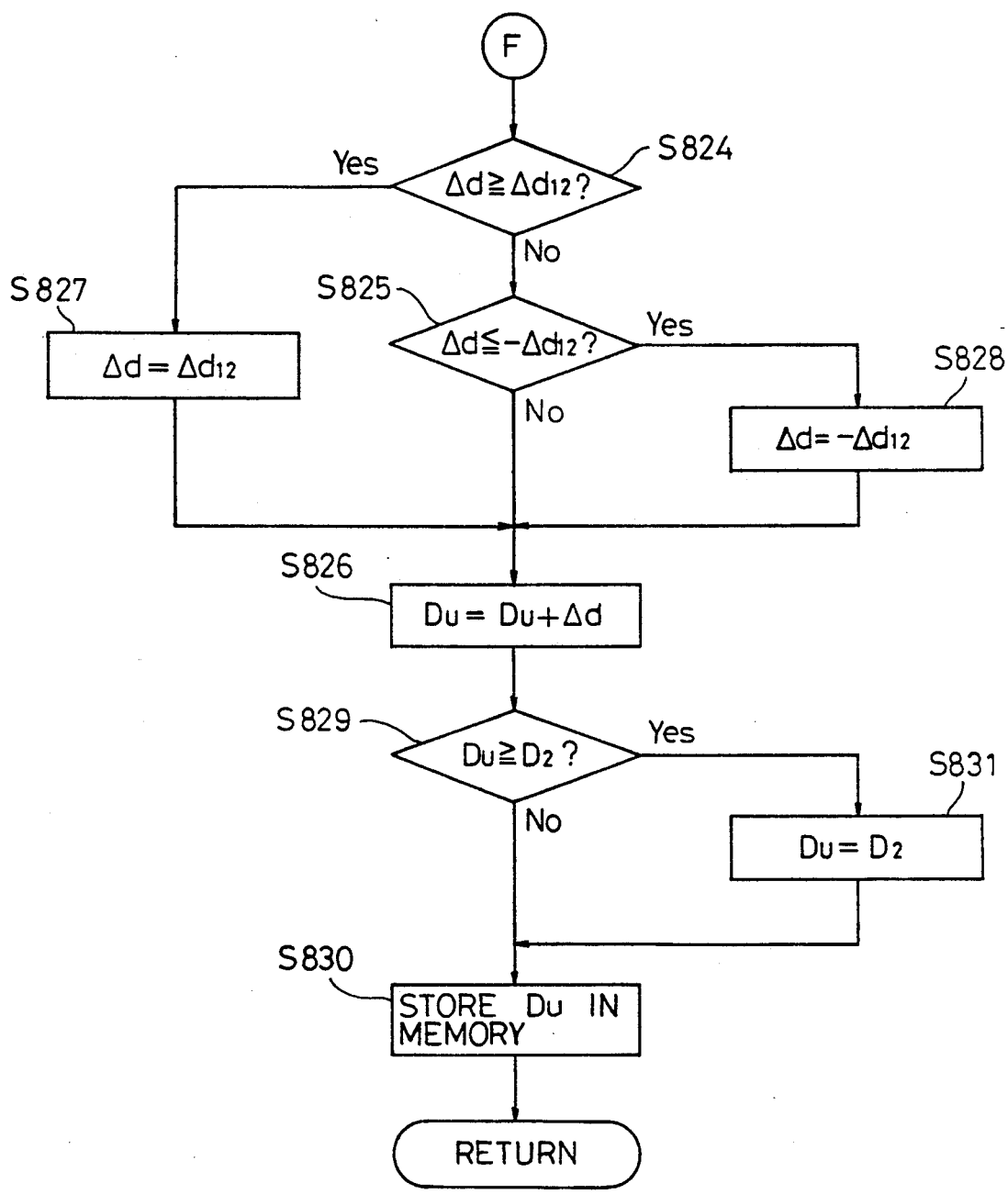

After the learning of the correction time $t_d$ is completed, as described above, learning of the duty factor $D_u$ for the initial stage of engagement is executed, as shown in FIGS. 11 and 12. First, in Step S815 of FIG. 11, a deviation $\Delta N$ between the average changing rate $\Delta N_{AV}$ of rotational speed, obtained in the L/R supply pressure control routine, and a target value $\Delta N_{AVO}$ (e.g., $-55$ rev/sec$^2$) is calculated from the following equation:

$$\Delta N = \Delta N_{AV} - \Delta N_{AVO}$$

In the subsequent Step S816, it is determined whether the deviation $\Delta N$ is not greater than zero. If the result of the determination is Yes, that is, if the rate of decrease of the rotational speed $N_T$ of the input shaft 20 is smaller than the target value, the program proceeds to Step S817, in which a target correction amount $\Delta d_o$ is calculated according to the following equation:

$$\Delta d_o = K_3 \cdot \Delta N$$

where $K_3$ is a constant and is set to, e.g., $-0.4\%$/rev/sec$^2$.

If the result of the determination in Step S816 is No, that is, if the rate of decrease of the rotational speed $N_T$ is greater than the target value, the target correction amount $\Delta d_o$ is calculated from the following equation, in Step S818:

$$\Delta d_o = K_4 \cdot \Delta N$$

where $K_4$ is a constant and is set to, e.g., $-0.1\%$/rev/sec$^2$.

Figure 14:
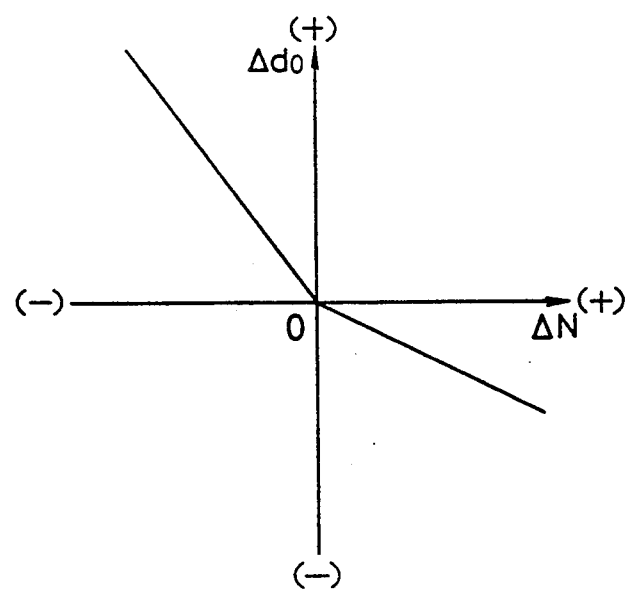
FIG. 14 is a graph showing the relationship between a deviation $\Delta N$ and a target correction amount $\Delta d_o$.

Accordingly, the target correction amount $\Delta d_o$ and the deviation $\Delta N$ have a relation as shown in FIG. 14.

In Step S819 subsequent to Step S817 or S818, it is determined whether the target correction amount $\Delta d_o$ is not smaller than a predetermined value $\Delta d_1$ (e.g., 1.2%). If the result of the determination is Yes, it is then determined in Step S820 whether the target correction amount $\Delta d_o$ is not greater than the predetermined value $-\Delta d_1$. If the results of the determinations in Steps S819 and S820 are both Yes, the program proceeds to Step S821. If, however, the result of the determination in Step S819 is No, $\Delta d_1$ is substituted for the target correction amount $\Delta d_o$, in Step S822, before Step S821 is executed. If the result of the determination in Step S820 is No, $-\Delta d_1$ is substituted for the target correction amount $\Delta d_o$, in Step S823, before the execution of Step S821.

In Step S821, the correction amount $\Delta d$ of the aforesaid duty factor $D_u$ for the initial stage of engagement is calculated from the following equation:

$$\Delta d = \Delta d + \Delta d_o$$

Since zero is set as the initial value of the correction amount $\Delta d$ before the learning routine is executed for the first time, the correction amount $\Delta d$ becomes representative of an accumulated value of the target correction amounts $\Delta d_o$ as Step S821 is repeatedly executed.

In Step S824 shown in FIG. 12, it is determined whether the correction amount $\Delta d$ is not greater than a predetermined value $\Delta d_{12}$ (e.g., 12.5%). If the result of the determination is No, it is then determined in Step S825 whether the correction amount $\Delta d$ is not smaller than the predetermined value $-\Delta d_{12}$, and if the result of this determination is No, Step S826 is immediately executed.

If, on the other hand, the result of the determination in Step S824 is Yes, the predetermined value $\Delta d_{12}$ is substituted for the correction amount $\Delta d$, in Step S827, and then Step S826 is executed. When the result of the determination in Step S825 is Yes, the predetermined value $-\Delta d_{12}$ is substituted for the correction amount $\Delta d$, in Step S828, before Step S826 is executed.

In Step S826, the duty factor $D_u$ for the initial stage of engagement is calculated according to the following equation:

$$D_u = D_u + \Delta d$$

In the subsequent Step S829, it is determined whether the duty factor $D_u$ for the initial stage of engagement is not greater than a predetermined value $D_2$ (e.g., 85%). If the result of the determination is No, the program proceeds directly to Step S830, but if the result of the determination is Yes, the predetermined value $D_2$ is substituted for the duty factor $D_u$ for the initial stage of engagement, in Step S831, before Step S830 is executed.

In Step S830, the duty factor $D_u$ for the initial stage of engagement, obtained in the preceding step, is stored in the nonvolative memory, and the learning routine is ended. The program then returns to the main routine of FIG. 3, and also the N-R shift main routine is ended.

In the above-described N-R shift main routine according to the embodiment of the invention, when the learning routine is executed, the correction time $t_d$ is corrected by learning, on the basis of the deviation $\Delta t$ between the shift start time $t_i$, which defines the main control pattern of FIG. 7, and the target value $t_o$ thereof. Further, the duty factor $D_u$ for the initial stage of engagement is also corrected by learning on the basis of the deviation $\Delta N$ between the average changing rate $\Delta N_{AV}$ of rotational speed and the target value $\Delta N_{AVO}$ thereof.

Accordingly, as the learning routine of the N-R shift main routine is executed repeatedly after an N-R signal is output, both the correction time $t_d$ and the duty factor $D_u$ for the initial stage of engagement, obtained through learning, become appropriate values. As a result, when the N-R shift is carried out next, the shift start time $t_i$ coincides with the target value $t_o$ and the average changing rate $\Delta N_{AV}$ of rotational speed coincides with the target value $\Delta N_{AVO}$, whereby the response characteristic of the N-R shift is stabilized and the feeling at N-R shifting is improved.

More specifically, after the correction time $t_d$ is suitably corrected by learning and then the pressure is supplied to the L/R brake 32 in accordance with the aforementioned precontrol pattern, play in the mechanism of the L/R brake 32 is eliminated. Therefore, when the pressure is thereafter supplied in accordance with the main control pattern, the shift start time $t_i$ coincides with target value $t_o$ thereof, whereby the response characteristic of shifting is stabilized.

On the other hand, since the duty factor $D_u$ for the initial stage of engagement is corrected by learning, in the case of this embodiment, the duty factor $D_3$ applied at the shift starting point S.B is also appropriately corrected on the basis of the corrected duty factor $D_u$. Accordingly, a suitable value can be set for the duty factor $D_3$ during a shifting between the shift starting point S. B and the shift ending point S. F, and the average changing rate of rotational speed of the input shaft 20 during the shifting, i.e., the rate of speed reduction of the input shaft 20, can be made coincident with the target value thereof. This makes it possible to reliably eliminate a peak in the output torque characteristic of the output shaft 50, which may otherwise occur during a shifting, and thus, the variation of the output torque is reduced and the feeling at shifting is improved.

Figure 15:
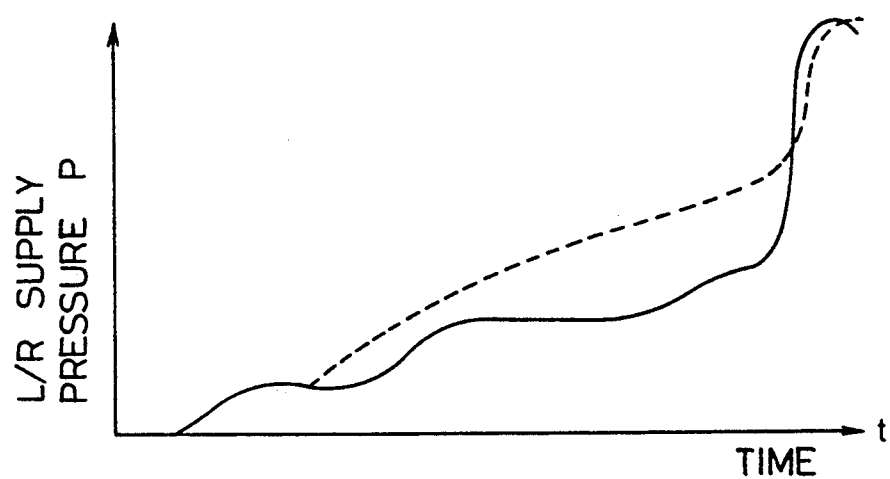
FIG. 15 is a graph showing a change of the supply pressure of the low/reverse brake when controlled in accordance with the control pattern of FIG. 7.
Figure 16:
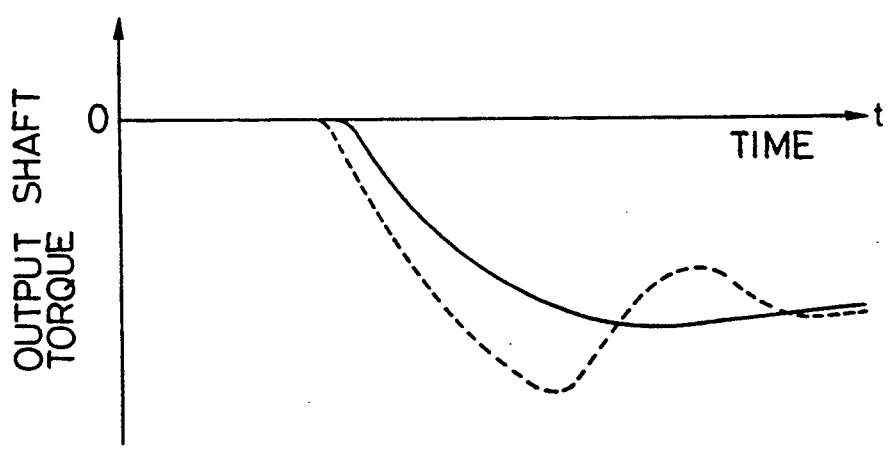
FIG. 16 is a graph showing a torque change of the output shaft of the automatic transmission when the supply pressure to the low/reverse brake is controlled in accordance with the control pattern of FIG. 7.

The solid lines in FIGS. 15 and 16 respectively indicate a change of the L/R supply pressure and a change of the torque of the output shaft 50 when the L/R supply pressure control routine according to the embodiment is executed. The dashed lines in FIGS. 15 and 16 respectively indicate a change of the L/R supply pressure and a change of the torque of the output shaft 50 when the learning control is not yet carried out or a shift control method having no learning function is executed. The dashed line in FIG. 8 indicates a change of the rotational speed of the input shaft 20 when the learning control is not yet carried out or a shift control method having no learning function is executed.

This invention is not limited to the above-described embodiment, and various modifications are possible. For example, although in the embodiment, the correction time $t_d$ is corrected by learning on the basis of the deviation $\Delta t$ between the shift start time $t_i$ and the target value $t_o$, the preliminary time $t_1$ of the precontrol pattern may be corrected by learning instead.

Moreover, the main control pattern is not limited to the one indicated by the solid line in FIG. 7, and may be a relatively simple pattern as indicated by the dashed line in the same figure.

Furthermore, this invention can be applied to a shifting of the automatic transmission from the neutral position to the drive position, in addition to a shifting from the neutral position to the reverse position. In this case, the engaging element whose pressure is subjected to duty control is the rear clutch 26, not the L/R brake 32, and an operating oil pressure which has been subjected to duty control by the PCSV 130 and the pressure control valve 112 is supplied to the rear clutch 26 through the manual valve 80 and the N-D control valve 126.

What is claimed is:

1. A shift control method for an automatic transmission of an automotive vehicle, in which
   the automotive vehicle includes an internal combustion engine and drive wheels, and
   the automatic transmission includes an input shaft connected to an internal combustion engine side, an output shaft connected to a drive wheel side, a shift gear mechanism connecting the input and output shafts for providing a plurality of different rotational speed ratios between the input and output shafts, engaging elements capable of frictionally engaging with the shift gear mechanism for selecting one of the rotational speed ratios of the shift gear mechanism, the engaging elements being operated by a fluid pressure supplied thereto, and a control device for electrically controlling the supply of the fluid pressure to the engaging elements, the control device having a storing device for storing a control pattern which determines the fluid pressure to be supplied to the engaging elements at a shifting of the automatic transmission, the shift control method comprising the steps of:

previously and separately preparing a precontrol pattern for executing a preliminary stage until play in a mechanism of the engaging element is eliminated, and a main control pattern for executing, subsequent to the precontrol pattern, an engagement stage in which the engaging element is operated substantially as the control pattern, the precontrol pattern being defined by at least one factor;

presetting an ideal reference time required from the start of the engagement stage until a shifting of the automatic transmission is substantially started;

measuring an actual time required from the start of the engagement stage to the start of the substantial shifting of the automatic transmission;

obtaining a difference between the actual time and the reference time; and correcting the factor of the precontrol pattern on the basis of the obtained difference such that the obtained difference is eliminated, and storing the corrected factor, wherein said step of correcting the factor includes a learning process of obtaining the corrected factor by learning, based upon the obtained difference between the actual time and the reference time.

2. The shift control method according to claim 1, wherein the precontrol pattern includes a preliminary region in which the fluid pressure supplied to the engaging element is maintained at a fixed value, the factor of the precontrol pattern being a period of continuance of the preliminary region.

3. The shift control method according to claim 1, wherein the precontrol pattern includes a plurality of preliminary regions for maintaining the fluid pressure supplied to the engaging element at different values, the factor of the precontrol pattern being a period of duration of one preliminary region.

4. The shift control method according to claim 1, wherein a substantial shift starting point of the automatic transmission during execution of the engagement stage is set to a point of time at which the rotational speed of the input shaft is varied by a predetermined rate with reference to the rotational speed of the input shaft at the start of the preliminary stage.

5. The shift control method according to claim 1, wherein the shifting of the automatic transmission is a shifting from a neutral state to a driving state thereof at a stop of the vehicle as required by a driver.

6. The shift control method according to claim 3, wherein the precontrol pattern includes a first preliminary region for supplying a fluid pressure having a first pressure value to the engaging element at the start of the preliminary stage, and a second preliminary region for supplying a fluid pressure having a second pressure value smaller than the first pressure value subsequently to the first preliminary region.

7. The shift control method according to claim 6, wherein the factor of the precontrol pattern comprises a period of duration of the second preliminary region.

8. The shift control method according to claim 6, wherein the automatic transmission includes a pressure source for supplying a constant fluid pressure to the engaging element, the first pressure value being set to the value of the fluid pressure supplied from the pressure source.

9. A shift control method for an automatic transmission of an automotive vehicle, in which the automotive vehicle includes an internal combustion engine and drive wheels, and the automatic transmission includes an input shaft connected to an internal combustion engine side, an output shaft connected to a drive wheel side, a shift gear mechanism connecting the input and output shafts for providing a plurality of different rotational speed ratios between the input and output shafts, engaging elements capable of frictionally engaging with the shift gear mechanism for selecting one of the rotational speed ratios of the shift gear mechanism, the engaging elements being operated by a fluid pressure supplied thereto, and a control device for electrically controlling the supply of the fluid pressure to the engaging elements, the control device having a storing device for storing a control pattern which determines the fluid pressure to be supplied to the engaging elements at a shifting of the automatic transmission, the shift control method comprising the steps of:

previously and separately preparing a precontrol pattern for executing a preliminary stage until play in a mechanism of the engaging element is eliminated, and a main control pattern for executing, subsequent to the precontrol pattern, an engagement stage in which the engaging element is operated substantially as the control pattern;

presetting an initial value of fluid pressure for the start of the main control pattern, and an ideal reference rate of change of the rotational speed of the input shaft for a period from the start of a substantial shifting of the automatic transmission to the end of same during the engagement stage;

supplying a fluid pressure to the engaging element in accordance with the initial value at the start of the engagement stage;

calculating an actual rate of change of the rotational speed of the input shaft from the start of the substantial shifting of the automatic transmission to the end of same during the execution of the engagement stage;

obtaining a difference between the calculated actual rate and the reference rate; and correcting the initial value of the precontrol pattern on the basis of the obtained difference such that the obtained difference is eliminated, wherein said step of correcting the initial value includes a learning process of obtaining a corrected initial value by learning, based upon the obtained difference between the actual rate and the reference rate.

10. The shift control method according to claim 9, wherein a substantial shift starting point of the automatic transmission during execution of the engagement stage is set to a point of time at which the rotational speed of the input shaft is varied by a predetermined rate with reference to the rotational speed of the input shaft at the start of the preliminary stage.

11. The shift control method according to claim 9, wherein the main control pattern includes a first engagement region in which the fluid pressure based on the initial value is gradually increased at a first rate from the start of the engagement stage to the start of the substantial shifting of the automatic transmission, a second engagement region in which the fluid pressure is maintained at a fixed value from the start of the substantial shifting to the end of same, and a third engagement region in which the fluid pressure is increased from the fixed value at a second rate from the end of the shifting to the end of the engagement stage, the second rate being set to a value greater than the first rate.

12. The shift control method according to claim 9, wherein the shifting of the automatic transmission is a shifting from a neutral state to a driving state thereof at a stop of the vehicle as required by a driver.

13. A shift control method for an automatic transmission of an automotive vehicle, in which the automotive vehicle includes an internal combustion engine and drive wheels, and the automatic transmission includes an input shaft connected to an internal combustion engine side, an output shaft connected to a drive wheel side, a shift gear mechanism connecting the input and output shafts for providing a plurality of different rotational speed ratios between the input and output shafts, engaging elements capable of frictionally engaging with the shaft gear mechanism for selecting one of the rotational speed ratios of the shift gear mechanism, the engaging elements being operated by a fluid pressure supplied thereto, and a control device for electrically controlling the supply of the fluid pressure to the engaging elements, the control device having a storing device for storing a control pattern which determines the fluid pressure to be supplied to the engaging elements at a shifting of the automatic transmission, the shift control method comprising the steps of:

previously and separately preparing a precontrol pattern for executing a preliminary stage until play in a mechanism of the engaging element is eliminated, and a main control pattern for executing, subsequent to the precontrol pattern, an engagement stage in which the engaging element is operated substantially as the control pattern, the precontrol pattern being defined by at least one factor;

presetting an initial value of fluid pressure for the start of the main control pattern, an ideal reference time required from the start of the engagement stage to the start of a substantial shifting of the automatic transmission, and an ideal reference rate of change of the rotational speed of the input shaft for a period from the start of the substantial shifting of the automatic transmission to the end of same during the engagement stage;

supplying a fluid pressure to the engaging element in accordance with the initial value at the start of the engagement stage;

measuring an actual time required from the start of the engagement stage to the start of the substantial shifting of the automatic transmission;

calculating an actual rate of change of the rotational speed of the input shaft from the start of the substantial shifting of the automatic transmission to the end of same during the execution of the engagement stage;

obtaining a first difference between the actual time and the reference time;

correcting the factor of the precontrol pattern on the basis of the obtained first difference such that the obtained first difference is eliminated, and storing the corrected factor;

obtaining a second difference between the calculated actual rate of change and the reference rate; and correcting the initial value of the precontrol pattern on the basis of the obtained second difference such that the obtained second difference is eliminated, wherein said step of correcting the factor includes a first learning process of obtaining the corrected factor by learning, based upon the obtained first difference between the actual time and the reference time, and said step of correcting the initial value includes a second learning process of obtaining a corrected initial value by learning, based upon the obtained second difference.

14. The shift control method according to claim 13, wherein the precontrol pattern includes a preliminary region in which the fluid pressure supplied to the engaging element is maintained at a fixed value, the factor of the precontrol pattern being a period of continuance of the preliminary region.

15. The shift control method according to claim 13, wherein the precontrol pattern includes a plurality of preliminary regions for maintaining the fluid pressure supplied to the engaging element at different values, the factor of the precontrol pattern being a period of duration of one preliminary region.

16. The shift control method according to claim 15, wherein the precontrol pattern includes a first preliminary region for supplying a fluid pressure having a first pressure value to the engaging element at the start of the preliminary stage, and a second preliminary region for supplying a fluid pressure having a second pressure value smaller than the first pressure value subsequently to the first preliminary region.

17. The shift control method according to claim 16, wherein the factor of the precontrol pattern comprises a period of duration of the second preliminary region.

18. The shift control method according to claim 16, wherein the automatic transmission includes a pressure source for supplying a constant fluid pressure to the engaging element, the first pressure value being set to the value of the fluid pressure supplied from the pressure source.

19. The shift control method according to claim 13, wherein a substantial shift starting point of the automatic transmission during execution of the engagement stage is set to a point of time at which the rotational speed of the input shaft is varied by a predetermined rate with reference to the rotational speed of the input shaft at the start of the preliminary stage.

20. The shift control method according to claim 10, wherein the main control pattern includes a first engagement region in which the fluid pressure based on the initial value is gradually increased at a first rate from the start of the engagement stage to the start of the substantial shifting of the automatic transmission, a second engagement region in which the fluid pressure is maintained at a fixed value from the start of the substantial shifting to the end of same, and a third engagement region in which the fluid pressure is increased from the fixed value at a second rate from the end of the shifting to the end of the engagement stage, the second rate being set to a value greater than the first rate.

21. The shift control method according to claim 13, wherein the shifting of the automatic transmission is a shifting from a neutral state to a driving state thereof at a stop of the vehicle as required by a driver.

* * * * *